United States Patent [19]

Trimarco et al.

[11] Patent Number: 5,048,277
[45] Date of Patent: Sep. 17, 1991

[54] HEDGE TRIMMER

[76] Inventors: Joseph Trimarco, 565 Cameron Ave., Elmont, N.Y. 11003; John DeBenedittis, 848 Dogwood Ave., Franklin Sq., N.Y. 11010

[21] Appl. No.: 561,891

[22] Filed: Aug. 2, 1990

[51] Int. Cl.⁵ .......................................... A01D 34/13
[52] U.S. Cl. .................................. 56/236; 56/237; 56/DIG. 4
[58] Field of Search ............... 56/236, 237, DIG. 24; 30/287

[56] References Cited

U.S. PATENT DOCUMENTS

| | | | |
|---|---|---|---|
| 2,051,862 | 8/1936 | Kaplan | 56/237 |
| 4,383,401 | 5/1983 | Lessard et al. | 56/236 |
| 4,729,212 | 3/1988 | Rabitsch | 56/DIG. 24 X |

Primary Examiner—William P. Neuder
Attorney, Agent, or Firm—Bauer & Schaffer

[57] ABSTRACT

A hedge trimmer provided with a deflector which deflects, gathers, and rolls forwardly together and simultaneously materials cut by the trimmer in the direction of the sweep of the trimmer.

11 Claims, 1 Drawing Sheet

HEDGE TRIMMER

BACKGROUND OF THE INVENTION

This invention relates to a hedge trimmer and, more particularly, to a device for deflecting, and gathering leaves, stems, and the like as they are cut from the hedge by the trimmer.

A wide array of hedge trimmers are known and are in common use. Exemplary of such devices is that disclosed in U.S. Pat. No. 2,051,862 to Kaplan, which is disadvantageous in that the leaves and stems are randomly flung about over the hedge and/or the ground. Since no provision is made for deflecting the cuttings in a precise and given manner so as to reduce debris, the gardener's job is much more difficult.

There exists, therefore, a need for a hedge trimmer which does not exhibit such a disadvantage. The present invention fulfills this need.

The objects and advantages of the present invention are set forth and described within the following disclosure.

SUMMARY

In accordance with the present invention, a hedge trimmer of the type having a reciprocating blade, adapted to cut in a direction transverse to the axis of reciprocation, is slidably secured to a coextending support bar superposed on the blade by bolt means extending through the blade. The improvement comprises mounting a deflector on the support bar. The deflector comprises a base, which is secured by the bolts, and a barrier wall extending upward from the base to arrest the rearward movement of the cut hedge material relative to the sweep of the trimmer, and carry the cuttings forward with the trimmer.

Full details of the present invention are described more fully in the following description, with references to the accompanying drawings.

DESCRIPTION OF THE PREFERRED EMBODIMENTS

Figure 1:
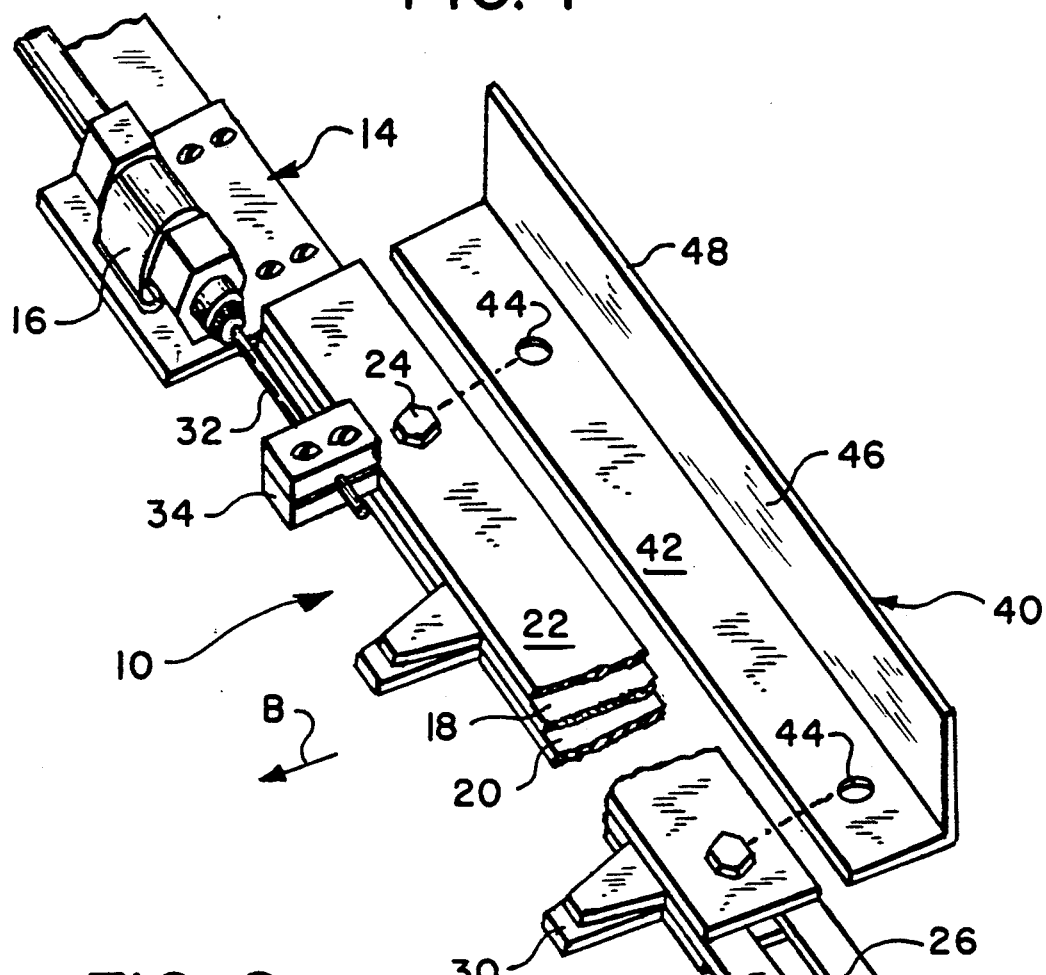
FIG. 1 is a partial plan view in perspective of a hedge trimmer according to the invention.

The present invention is illustrated in FIG. 1 as employed on the type of conventional hedge trimmer illustrated in the aforementioned patent. The hedge trimmer depicted by the number 10 generally comprises an elongated cutting assembly 12 mounted at the end of a handle 14 to which the drive source (not shown) and the reduction gear or rotary to reciprocating motion changer 16 are mounted. In this trimmer the cutting assembly comprising a reciprocating blade 18, slidably sandwiched between a lower counter bar 20 fixed to handle 14 and an upper cover bar 22 fixed to the lower counter bar by a plurality of bolts 24. The blade 18 is provided with elongated slots 26, permitting the bolts 24 to freely pass therethrough, allowing the blade to reciprocately traverse in the axial direction shown by arrow A. Extending laterally from one edge of the blade 18 are a plurality of cutter teeth 28 which are preferably provided with sharpened edges. The counter bar 20 is similarly formed with cutter teeth 30, which act as counter anvils to the cutter teeth 28 on the movable blade 18. The cutters 30 may also have sharpened edges.

The gear reducer or rotary to reciprocating motion changer 16 is connected to the movable blade 18 by the extending rod 32 which is fixed at its outer end to a clamp block 34. As is well known, the trimmer is normally used with blade 18 in reciprocating motion, being swept laterally to its length in the direction of arrow B, across the hedge (not shown) so that the cuttings of leaves, twigs, etc. fly over the upper bar and fall with considerable force and speed behind the flow of the trimmer. It is this speed and force that cause the leaves and twigs to become dispersed over a wide area, creating a messy garden subsequently requiring extensive cleaning and adding to the cost of maintenance of the hedge.

In accordance with the present invention, the foregoing difficulty is overcome by mounting an elongated deflector 40 to the cutting assembly 12. In the embodiment shown in FIG. 1, the reflector 40 is preferably an elongated bracket having a right angle cross section, the base 42 of which is provided with holes 44 and an upright barrier wall 46 extending perpendicular to the base and terminating in a straight edge 48. The holes 44 are spaced to be in alignment with the bolts 24 so that the deflector 40 can be fixedly attached to the upper bar 22.

Figure 2:
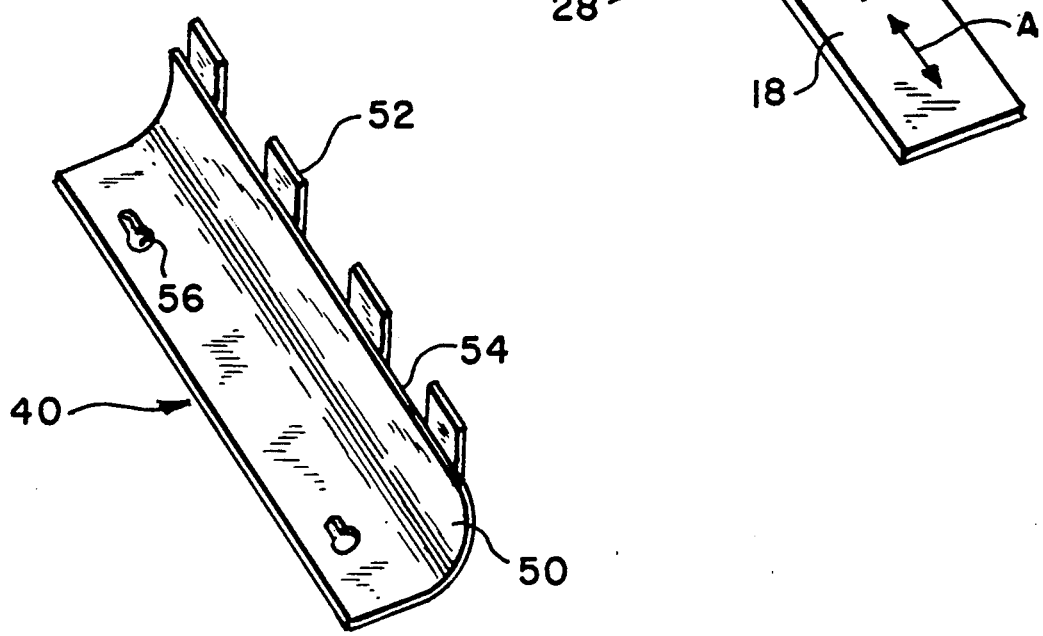
FIG. 2 is a plan view in perspective of a deflector having a curved barrier wall.

In the embodiment shown in FIG. 2, where the same numerals refer to the same parts, a curved barrier wall 50 is provided having a plurality of spaced teeth 52 extending upwardly and preferably slightly curved forwardly along the thus discontinuous upper edge 54 of the barrier wall. The teeth 50 may be omitted if desired, leaving the edge 54 continuous with the deflector curved. As shown in FIG. 2, shaped holes 56, allow the deflector to be secured to the cutter assembly and removed without having to first completely remove the bolts 24.

In the embodiment of FIG. 1 the barrier wall is substantially perpendicular, while the embodiment in FIG. 2 it is curved forwardly over the cutter assembly. In either case, the barrier walls define a face of attack against the cuttings so that the rearward movement of the leaves and twigs is substantially arrested. The height of the barrier wall, however, is such that only a small amount of the leaves and twigs pile against on the deflector at any given time so that the operation of the cutting blades is not interferred. As the trimmer sweeps forwardly over the hedge, the newly cut material pushes and causes the previously cut material to roll forwardly together with the sweep of the trimmer and fall quietly on already trimmed hedge or onto the ground, thus preventing random dispersal of the cuttings.

The teeth shown in the embodiment of FIG. 2 tend to prevent jam-up of the accumulated trash on the barrier wall by separating portions of the trash so that a continuous flow may be obtained. They also tend to separate leaves from twigs so that the twigs do not act as catapults for the leaves, etc. The length of the deflector is made to conform to the effective length of the cutting assembly and may thus be anywhere up to, for example, 48 inches. The width of the base is not critical but has been found to be most effective at about 1¼ inches. The height of the barrier wall has been found to be effective at about 1½-2 inches when curved at a radius of curvature of at approximately 1½ inches. The teeth may have a width of 2 inches and may be spaced at about ¾ inch apart. Of course, other dimensions can be employed as will be obvious to those skilled in the art.

It is to be understood that while the trimmer structure disclosed herein is shown as it is employed as a single-sided trimmer and one elongated blade, it is in the purview of this invention to also use the deflector on a double-sided trimmer and double blade construction.

Various other changes and modifications will be obvious to those skilled in this art. Accordingly, it is intended that the present disclosure be taken as illustrative only and not limiting of the present invention. While it is most convenient to attach the deflector to the bolts holding the extending blade and support bar, the deflector may, nevertheless, be secured in any other manner such as being attached to the handle or welded to the support bar, or by any other bracket holding means. In addition, the deflector may be provided with its own bolts or fasteners so that it can be attached to the support bar independent of the slide bolts.

What is claimed is:

1. In a hedge trimmer of the type having a reciprocating blade adapted to cut in a direction transverse to the axis of reciprocation and wherein said reciprocating blade is slidably secured to a coextending support bar superposed over said blade by bolt means extending through said blade, the improvement comprising a deflector comprising a base and a barrier wall, said base being secured to said support bar in proximity to the surface of said support bar so that said barrier wall arrests the movement of the cut hedge material relative to the sweep of the trimmer.

2. The improvement according to claim 1, wherein the base and barrier wall of the deflector are arranged so that the barrier wall has an attacking face to the cut hedge whereby the cut hedge is gathered, rolled, and deflected forward of the barrier wall.

3. The improvement according to claim 2, wherein said base and said barrier wall are at right angles to each other.

4. The improvement according to claim 2, wherein said barrier wall is curved, and its concave surface extends over the base.

5. The improvement according to claim 3, wherein said barrier wall terminates in an upper edge having a plurality of spaced teeth members formed thereon and extending upwardly therefrom.

6. The improvement according to claim 4, wherein said barrier wall terminates in an upper edge having a plurality of spaced teeth members formed thereon and extending upwardly therefrom.

7. The improvement according to claim 1, wherein the base of said deflector is provided with holes conforming to the location of the bolt means for securing thereto.

8. The combination of a hedge trimmer comprising a pair of elongated clipping blades having cutters formed along at least one edge thereof and arranged in superposed relation with means for supporting and guiding said blade for longitudinally reciprocating motion transverse to the direction of said blades; reciprocating means connected to the longitudinally movable blade to move said blade with respect to the support means; power means connected to said reciprocating means to impart reciprocating movement thereto; and deflector means supported on the support means in proximity to the surface thereof opposite said cutter, said deflector means arresting the materials cut by said trimmer, and gathering and rolling said cut materials together in the direction of the sweep of said trimmer.

9. The combination according to claim 8, wherein the means supporting the blades includes a counter, and the deflector means is a longitudinal right angle bracket.

10. The combination according to claim 9, wherein the counter is a longitudinal flat member provided with holes for the reception of bolts, said holes being in alignment with openings in the longitudinal movable blade and with holes in the other blade, said counter being disposed over said longitudinal movable blade, and the longitudinal right angle bracket includes a base member and a barrier wall, said base member provided with holes for the reception of bolts, said holes being in alignment with the holes in said counter, and said right angle bracket forming the deflector being disposed on said counter and attached thereto by bolts joining said blades, said counter, and said deflector through said holes.

11. The combination according to claim 3, wherein the barrier wall is curved.

* * * * *